United States Patent
Hata

(10) Patent No.: US 9,476,786 B2
(45) Date of Patent: Oct. 25, 2016

(54) PRESSURE SENSOR UNIT

(71) Applicant: ANEST IWATA Corporation, Kanagawa (JP)

(72) Inventor: Takayuki Hata, Kanagawa (JP)

(73) Assignee: ANEST IWATA CORPORATION, Kanagawa (JP)

( * ) Notice: Subject to any disclaimer, the term of this patent is extended or adjusted under 35 U.S.C. 154(b) by 67 days.

(21) Appl. No.: 14/645,983

(22) Filed: Mar. 12, 2015

(65) Prior Publication Data

US 2015/0260600 A1 Sep. 17, 2015

(30) Foreign Application Priority Data

Mar. 14, 2014 (JP) ................. 2014-052207

(51) Int. Cl.

| | |
|---|---|
| G01L 7/00 | (2006.01) |
| G01L 19/00 | (2006.01) |
| B05B 12/00 | (2006.01) |
| B05B 7/02 | (2006.01) |
| B05B 7/24 | (2006.01) |
| B05B 7/08 | (2006.01) |
| B05B 7/12 | (2006.01) |

(52) U.S. Cl.
CPC ............ *G01L 19/00* (2013.01); *B05B 12/008* (2013.01); *B05B 7/02* (2013.01); *B05B 7/0815* (2013.01); *B05B 7/129* (2013.01); *B05B 7/2405* (2013.01); *B05B 7/2478* (2013.01)

(58) Field of Classification Search
CPC ..... G01L 19/0007; G01L 19/00; G01L 7/00; G01N 3/12; G01F 1/74
USPC ................. 73/756, 700, 37, 861.42
See application file for complete search history.

(56) References Cited

U.S. PATENT DOCUMENTS

| | | | |
|---|---|---|---|
| 7,384,004 B2 | 6/2008 | Rogers | |
| 7,422,164 B2 | 9/2008 | Matsumoto | |
| 8,387,656 B2 | 3/2013 | Davies et al. | |
| 8,857,732 B2 | 10/2014 | Brose et al. | |
| 2003/0230636 A1* | 12/2003 | Rogers ...................... | B05B 7/12 239/71 |
| 2005/0127201 A1* | 6/2005 | Matsumoto ............... | B05B 7/02 239/71 |
| 2012/0012671 A1* | 1/2012 | Brose ........................ | B05B 7/12 239/71 |

FOREIGN PATENT DOCUMENTS

| | | |
|---|---|---|
| DE | 10 2009 020 194 | 11/2010 |
| EP | 1 375 013 | 1/2004 |
| EP | 1 477 232 | 11/2004 |
| GB | 2 411 235 | 8/2005 |

(Continued)

OTHER PUBLICATIONS

Extended European Search Report issued Aug. 4, 2015 in European Application No. 15158768.0.

*Primary Examiner* — Lisa Caputo
*Assistant Examiner* — Nigel Plumb
(74) *Attorney, Agent, or Firm* — Wenderoth, Lind & Ponack, L.L.P.

(57) ABSTRACT

A pressure sensor unit to be attached to an air inlet port of an air tool, comprising a valve portion configured to shut off an air supply from an air passage through an induction pipe insertion portion when an air induction pipe of the air tool is not inserted in the induction pipe inserting portion, and configured to open the air supply from the air passage into the air induction pipe by the valve portion being pushed by the air induction pipe when the air induction pipe is inserted into the induction pipe inserting portion.

9 Claims, 8 Drawing Sheets

(56) References Cited

FOREIGN PATENT DOCUMENTS

| JP | 2003-211034 | 7/2003 |
| JP | 3533387 | 5/2004 |
| JP | 4276001 | 6/2009 |
| JP | 5225979 | 7/2013 |
| JP | 5622839 | 11/2014 |
| WO | 2007/127110 | 11/2007 |
| WO | 2010/127766 | 11/2010 |

* cited by examiner

PRESSURE SENSOR UNIT

TECHNICAL FIELD

The present invention relates to a pressure sensor unit and more particularly to a pressure sensor unit which is attached to an air inlet port of an air tool.

BACKGROUND ART

For example, a paint spray gun which atomizes jetted paint by supplying air needs an appropriate control of a spraying air pressure. Because of this, as is disclosed, for example, in Japanese Unexamined Patent Publication No. 2003-211034, a paint spray gun is known in which a pressure sensor unit is fixed to a gun main body with a screw, which pressure sensor unit incorporates an air induction port which is connected to an air passage in the gun main body, a pressure sensor, and a display which displays a pressure value detected by the pressure sensor.

SUMMARY OF THE INVENTION

However, in a paint spray gun like the one described above (hereinafter, also referred to as an air tool as a generic concept), a tool is necessary to remove the pressure sensor unit after the pressure is confirmed, and when the pressure sensor unit is removed, a main plug of an air supply source needs to be closed. Thus, the conventional paint spray gun is found troublesome in this respect.

The invention has been made in view of these situations, and an object thereof is to provide a pressure sensor unit which eliminates troublesomeness accompanied by removing the pressure sensor unit from an air tool and troublesomeness accompanied by closing a main plug of an air supply source when the pressure sensor unit is removed.

The invention is grasped by the following configurations.

According to one aspect of the present invention, a pressure sensor unit is to be attached to an air inlet port of an air tool and comprises: a unit main body including an induction pipe inserting portion configured to receive an air induction pipe projecting from the air tool, the unit main body configured to be detachably attached to the air tool by inserting the air induction pipe into the induction pipe inserting portion; an air passage configured to receive supply of air from the outside and configured to communicate with the induction pipe inserting portion; a pressure sensor configured to measure a pressure inside the air passage; and a valve portion configured to shut off an air supply from the air passage through the induction pipe insertion portion when the air induction pipe is not inserted in the induction pipe inserting portion, and configured to open the air supply from the air passage into the air induction pipe by the valve being pushed by the air induction pipe when the air induction pipe is inserted into the induction pipe inserting portion.

According to one aspect of the present invention, a pressure sensor unit is to be attached to an air inlet port of an air tool and comprises: a unit main body including an induction pipe inserting portion configured to receive an air induction pipe projecting from the air tool, the unit main body configured to be attached to the air tool detachably without a tool by inserting the air induction pipe into the induction pipe inserting portion; an air passage configured to receive supply of air from the outside and configured to communicate with the induction pipe inserting portion; and a pressure sensor configured to measure a pressure inside the air passage.

DETAILED DESCRIPTION OF THE PREFERRED EMBODIMENTS

Figure 1A:
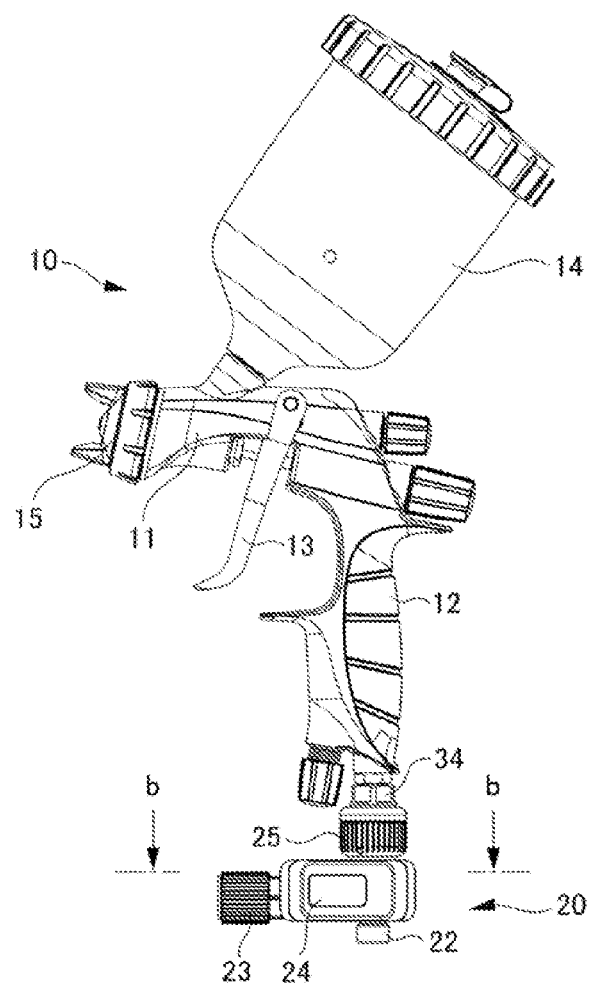
FIG. 1A is a side view of a paint spray gun as an air tool to which a pressure sensor unit of the invention is attached.

Hereinafter, referring to the accompanying drawings, modes for carrying out the invention (hereinafter, referred to as embodiments) will be described in detail. Like reference numerals will be given to like elements throughout the description of the embodiments.

Embodiment 1

Figure 1B:
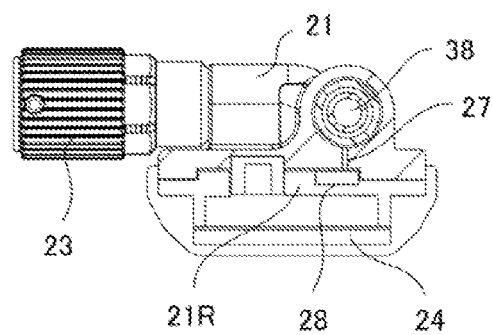
FIG. 1B is a sectional view taken along a line b-b in FIG. 1A.

FIG. 1A is a side view showing a paint spray gun as an air tool to which a pressure sensor unit of the invention is attached. FIG. 1B is a sectional view taken along a line b-b in FIG. 1A.

In FIG. 1A, a paint spray gun 10 includes a gun main body 11, a grip portion 12, a trigger 13 and a paint container cup 14. Paint is supplied from the paint container cup 14 to a distal end portion (a left end portion in the figure) of the gun main body 11, so that the paint so supplied is then jetted out through a paint jetting nozzle (not shown) at a distal end of the gun main body 11. A pressure sensor unit 20 is provided at a bottom portion of the grip portion 12. Outside air is supplied to the gun main body 11 by way of the pressure sensor unit 20 and the grip portion 12, so that the air so supplied is jetted out through an air cap 15 attached to the distal end of the gun main body 11. The paint and air are jetted out by operating the trigger 13, and the paint jetted out from the paint jetting nozzle is atomized by the air jetted out from the air cap 15.

Figure 2:
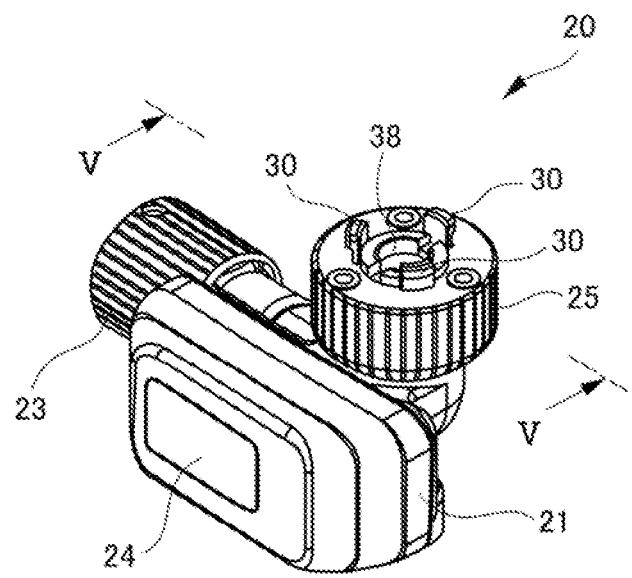
FIG. 2 is a perspective view of the pressure sensor unit.

The pressure sensor unit 20 includes a unit main body 21, and an air inlet port 22, a knob 23 which controls the flow rate of air from the air inlet port 22, a display 24 which displays a value of a pressure of the air with controlled flow rate, and an attachment portion 25 which is attached to the bottom portion of the grip portion 12, the air inlet port 22, the knob 23, the display 24 and the attachment portion 25 being provided on the unit main body 21. As shown in FIG. 1B, the pressure sensor unit 20 has an air passage 38 which communicates with the air inlet port 22. A pressure in the air passage 38 is detected by a pressure sensor 28 through a communication hole 27 which is connected to the air passage 38, and a measured value measured by the pressure sensor is displayed on the display 24. FIG. 2 is a perspective view of the pressure sensor unit 20. A plurality of (for example, three in the figure) hook claw portions 30 are provided along a circumference of an opening of the air passage 38 at equal intervals on the attachment portion 25 to the paint spray gun 10 so as to be erected therefrom.

Figure 3:
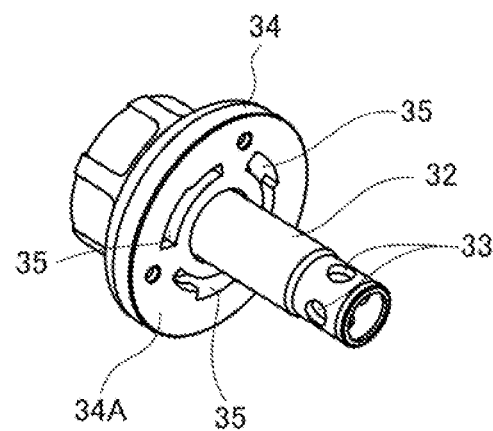
FIG. 3 is a perspective view showing an air induction pipe which is attached to a grip portion of the paint spray gun in such a way as to project from the grip portion.

FIG. 3 is a perspective view showing an air induction pipe 32 which is attached to the grip portion 12 of the paint spray gun 10 in such a way as to project from the grip portion. As shown in FIG. 3, the air induction pipe 32 has a plurality of (for example, four in the figure) air passage holes 33 which are formed along a circumferential direction at one end portion of the air induction pipe and a flange-shaped attachment bearing portion 34 at the other end portion which is attached to the paint spray gun 10 (an air tool). A communication hole 12A (refer to FIG. 4) is formed in the attachment bearing portion 34. This communication hole 12A establishes a communication between an air passage (not shown) in the paint spray gun 10 and the air induction pipe 32 when the attachment bearing portion 34 is attached to the paint spray gun 10. In the attachment bearing portion 34, a plurality of (for example, three in the figure) elongated holes 35 are formed in a surface 34A which lies to face the air induction pipe 32. As will be clarified later in the description, the hook claw portions 30 (refer to FIG. 2) which are formed on the pressure sensor unit 20 are inserted individually into the elongated holes 35 for connection of the attachment bearing portion 34 with the attachment portion 25 of the pressure sensor unit 20.

In this specification, the paint spray gun 10 including the air induction pipe 32 attached to the paint spray gun 10 may be referred to as an air tool as a generic concept.

Figure 4:
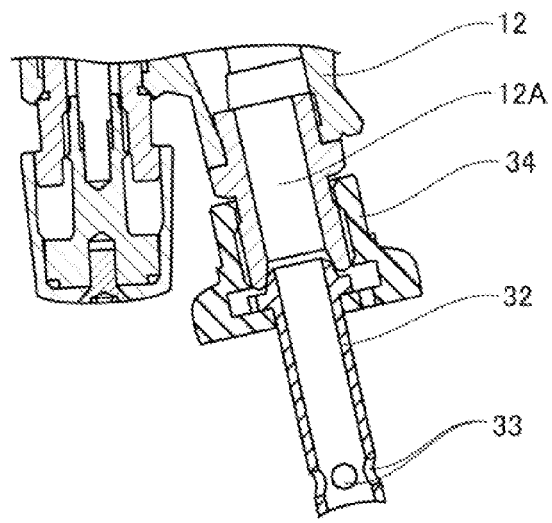
FIG. 4 is a sectional view of part of the paint spray gun when the air induction pipe is attached to the grip portion.

FIG. 4 is a sectional view taken along a plane which includes an axis of the air induction pipe 32, showing a state in which the air induction pipe 32 is attached to the grip portion 12 of the paint spray gun 10. The attachment bearing portion 34 to which the air induction pipe 32 is attached is attached to the grip portion 12 through screw engagement, whereby the attachment bearing portion 34 is fixed to the paint spray gun 10 without being loosened, and the air passage in the grip portion 12 communicates with the air induction pipe 32.

Figure 5:
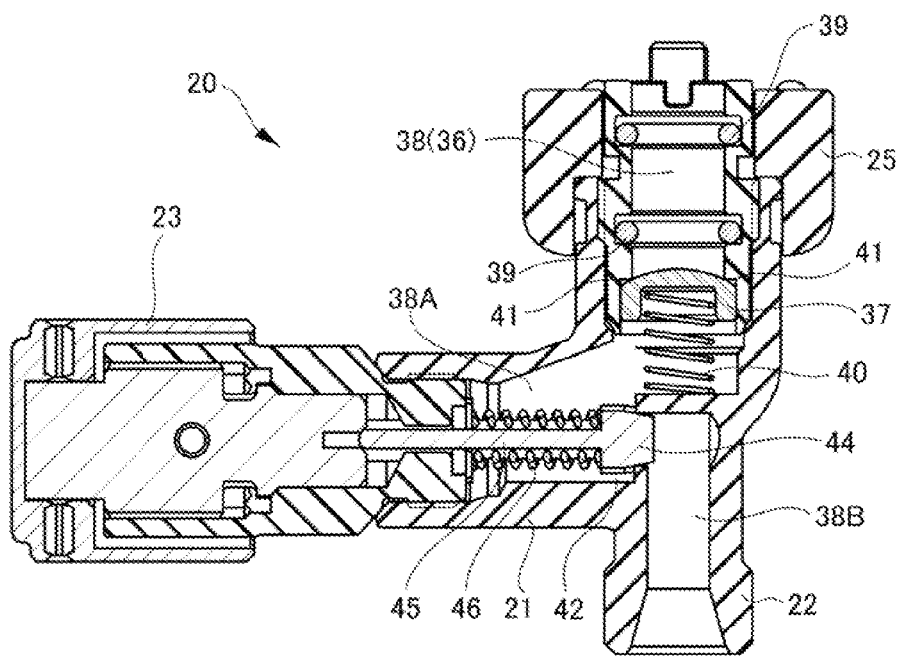
FIG. 5 is a sectional view showing an internal construction of the pressure sensor unit.

FIG. 5 is a sectional view taken along a line V-V in FIG. 2, showing an internal construction of the pressure sensor unit. As shown in FIG. 5, in the pressure sensor unit 20, an induction pipe inserting portion 36, a valve portion 37 and air passages 38A, 38B, which make up part of the air passage 38, are formed from the attachment portion 25 to the air inlet port 22. The air induction pipe 32 is inserted into the induction pipe inserting portion 36, and a plurality of (for example, two in the figure) O-rings 39 are embedded in a circumference of the induction pipe inserting portion 36 in an axial direction thereof. The valve portion 37 is disposed so as to slide in the axial direction of the induction pipe inserting portion 36 and is biased towards the attachment portion 25 by a spring 40. When the valve portion 37 is biased to move a predetermined distance or more, such a movement of the valve portion 37 is restricted by a step portion 41 formed on a circumferential wall of the induction pipe inserting portion 36. The air passage 38A is formed to have a bypass portion starting from a portion where the valve portion 37 is disposed and a right-angled intersecting portion 42 to the air passage 38B which is disposed coaxially with the induction pipe inserting portion 36 and which connects to the air inlet port 22.

An air quantity control valve 44 is disposed in the right-angled intersecting portion 42 between the air passage 38A and the air passage 38B. The air quantity control valve 44 controls quantities of air in the air passages 38A, 38B through axial movements of a shaft member 45 attached to the air quantity control valve 44 which is so moved by rotating the knob 23 attached to the unit main body 21. The air quantity control valve 44 is biased by a spring 46.

Figure 6:
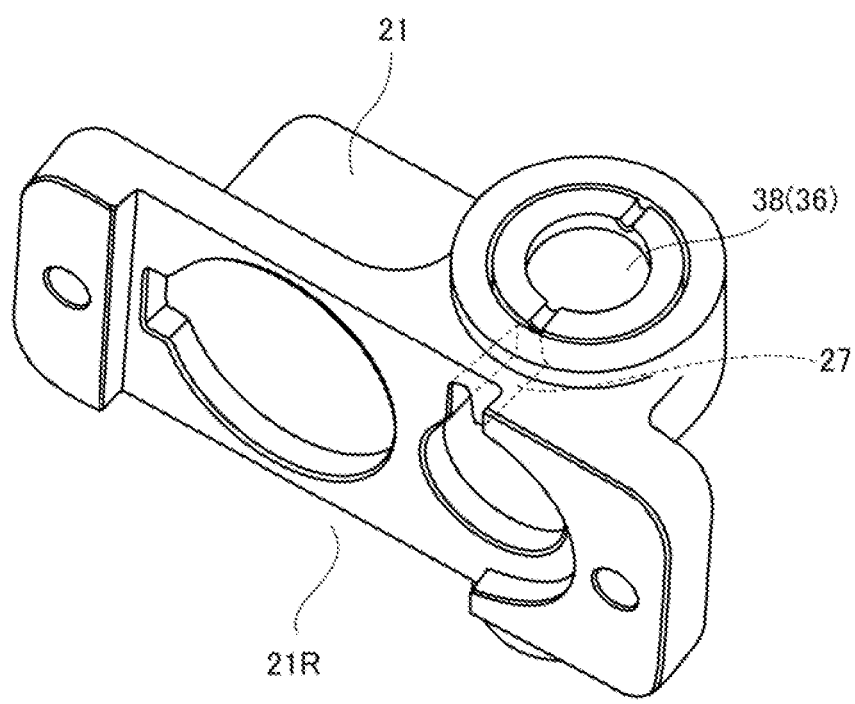
FIG. 6 is a partially cutaway perspective view of the pressure sensor unit showing a part thereof which forms a pressure measuring compartment.

As shown in FIG. 1B, the communication hole 27 is formed downstream of the air quantity control valve 44 in the air passage 38A. A pressure within the air passage 38A is transmitted to a pressure measuring compartment (a pressure measuring portion) 21R within the unit main body 21 through the communication hole 27. A pressure sensor 28, an electric circuit and the display 24 made up, for example, of a liquid crystal display are disposed in the pressure measuring compartment 21R. A pressure in the air passage 38A is detected by the pressure sensor 28 through the communication hole 27, and a value of the measured pressure is sent to the display 24 by way of the electric circuit for display thereon. FIG. 6 is a partially cutaway perspective view showing a part of the unit main body 21 which makes up the pressure measuring compartment 21R. The communication hole 27 which is formed in part of the air passage 38A is shown as communicating with the pressure measuring compartment 21R.

Figure 7A:
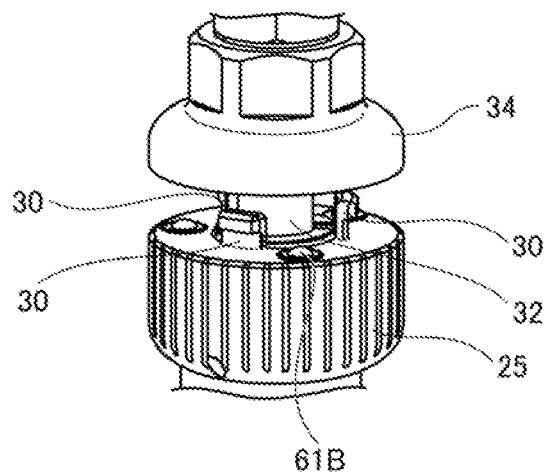
FIGS. 7A, 7B are perspective views showing a relationship between an attachment portion of the pressure sensor unit and an attachment bearing portion of the paint spray gun as viewed from above and below, respectively.
Figure 7B:
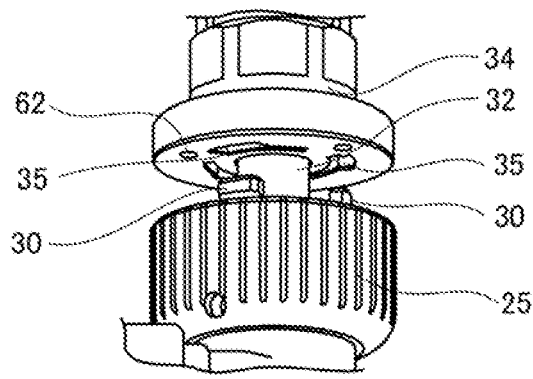
Figure 7C:
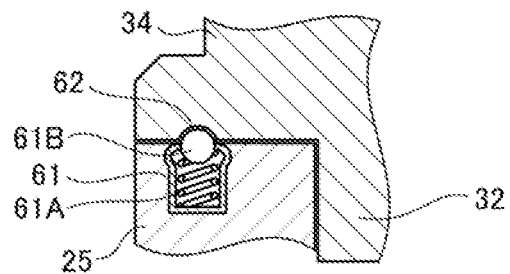
FIG. 7C is a sectional view of a portion where a ball is provided, showing how the ball works when the attachment portion is brought into complete engagement with the attachment bearing portion.
Figure 8A:
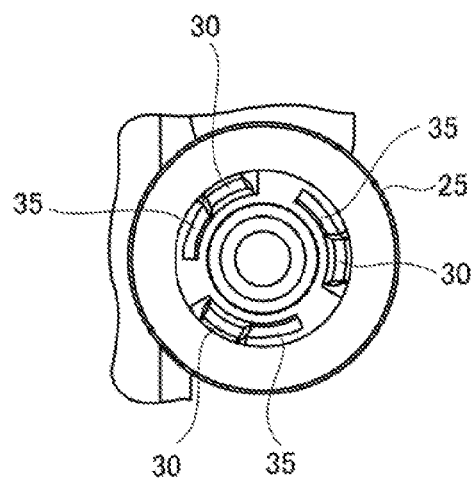
FIG. 8A is a plan view showing that hook claw portions are inserted in wide portions of elongated holes.

FIGS. 7A, 7B are perspective views showing a relationship between the attachment portion 25 of the pressure sensor unit 20 and the attachment bearing portion 34 of the paint spray gun 10 as viewed from above and below, respectively. The plurality of (for example, three) hook claw portions 30 are provided concentrically along the circumference of the opening of the air passage 38 at equal intervals on the attachment portion 25 of the pressure sensor unit 20 so as to be erected therefrom (refer to FIG. 2). The hook claw portion 30 has an inverted "L" shape and has a radial projecting portion at a distal end of the hook claw portion. The plurality of (for example, three) elongated holes 35 are formed concentrically around the air induction pipe 32 of the attachment bearing portion 34 of the paint spray gun 10. As shown in FIG. 8A, each elongated hole 35 is formed so as to be wide at one circumferential end portion and narrow at the other circumferential end portion. Additionally, a plurality of (for example, three) balls 61B are disposed concentrically around the air passage 38 in the attachment portion 25 in such a way as to partially project from the attachment portion 25. As shown in a sectional view of FIG. 7C, these balls 61B are incorporated in biasing members 61 like commercially marketed ball plungers which are embedded in the attachment portion 25. The balls 61B are biased by springs 61A and are restricted from jumping out of the corresponding biasing members 61. FIG. 7C is the sectional view showing a complete engagement of the attachment portion 25 with the attachment bearing portion 34. Holes 62 are provided on the attachment bearing portion 34 in positions which correspond to the balls 61B, and the balls 61B are made to partially fit in the corresponding holes 61 by being biased by the corresponding springs 61A.

Figure 8B:
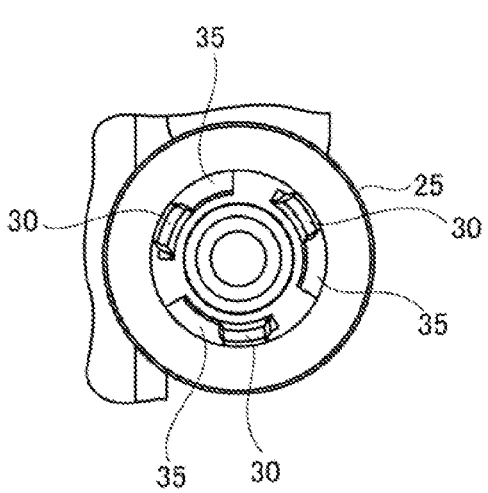
FIG. 8B is a plan view showing that the hook claw portions are fitted in narrow portions of the elongated holes.

FIG. 8A shows that the hook claw portions 30 of the attachment portion 25 are inserted into the wide portions of the elongated holes 35 of the attachment bearing portion 34, and FIG. 8B shows that the hook claw portions 30 of the attachment portion 25 fit in the narrow portions of the elongated holes 35 as a result of the attachment portion 25 being rotated. As this occurs, since the attachment portion 25 is rotated while being pressed against the attachment bearing portion 34, the balls 61B are partially pushed into the biasing members 61, whereby the resulting reaction force acts on the attachment portion 25, attempting to cause the attachment portion 25 to move away from the attachment bearing portion 34 in the axial direction. However, the projecting portions at the distal ends of the hook claw portions 30 are locked on the attachment bearing portion 34, whereby the axial movement of the attachment portion 25 is restricted. Then, the balls 61B partially fit in the holes 62 as a result of the attachment portion 25 being rotated, and a working person can be let known that the attachment portion 25 is completely attached to the attachment bearing portion 34 through sitting sounds produced when the balls 61B so fit in the holes 62 and a sensation felt then. Then, the rotational movement of the attachment portion 25 is restricted, and the attachment portion 25 is brought into complete engagement with the attachment bearing portion 24. By moving the attachment portion 25 in a reverse direction, the hook claw portions of the attachment portion 25 are allowed to be released from the elongated holes 35 of the attachment bearing portion 34. By adopting this configuration, the pressure sensor unit 20 can easily be attached to and detached from the paint spray gun 10.

Figure 8C:
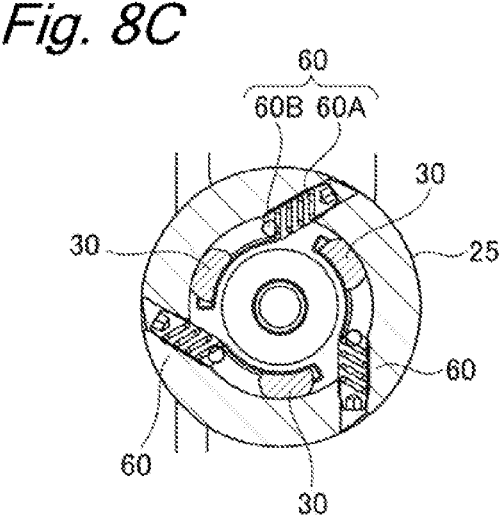
FIG. 8C is a sectional view showing a positional relationship between the hook claw portions and biasing members.
Figure 8D:
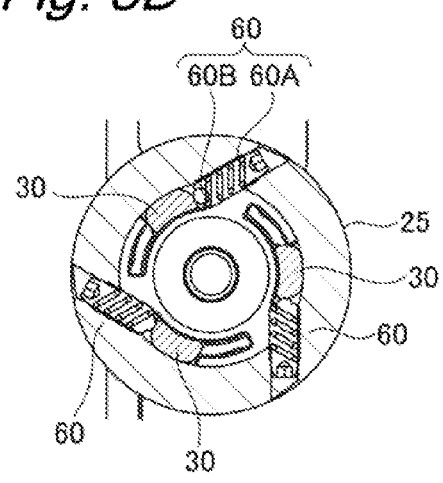
FIG. 8D is a sectional view showing a state in which the hook claw portions start contacting the corresponding biasing members.

FIG. 8C shows that biasing members 60 are provided in the sensor unit 20 while being biased in a direction which restricts the hook claw portions 30 from being released from the elongated holes 35 so that the hook claw portions 30 cannot easily be released from the elongated holes 35 so as to prevent the pressure sensor unit 20 from being dislocated (released) unintentionally from the paint spray gun 10 while the working person is operating the paint spray gun 10. As the biasing members 60, a commercially marketed ball plunger is used which is configured so that the ball 60B is biased at all times by a distal end of the incorporated spring 60A, for example. These biasing members 60 are screwed into the attachment portion 25 from three directions at equal intervals in such a way as to surround the center of the attachment bearing portion 34. Then, as shown in FIG. 8D, when the hook claw portions 30 approach the biasing members 60, a reaction force is generated in the biasing members 60 so that the hook claw portions 30 do not approach the positions where the wide portions of the elongated holes 35 are formed. In this configuration, when removing the pressure sensor unit 20, the working person rotates the attachment portion 25 so as to overcome the reaction force with a clear intention that he or she removes the pressure sensor unit 20. Thus, there is provided an advantage that the pressure sensor unit 20 to which the pressure of compressed air is applied is not dislocated unintentionally while the paint spray gun 10 is used, whereby a painting operation can be executed safely.

Figure 9:
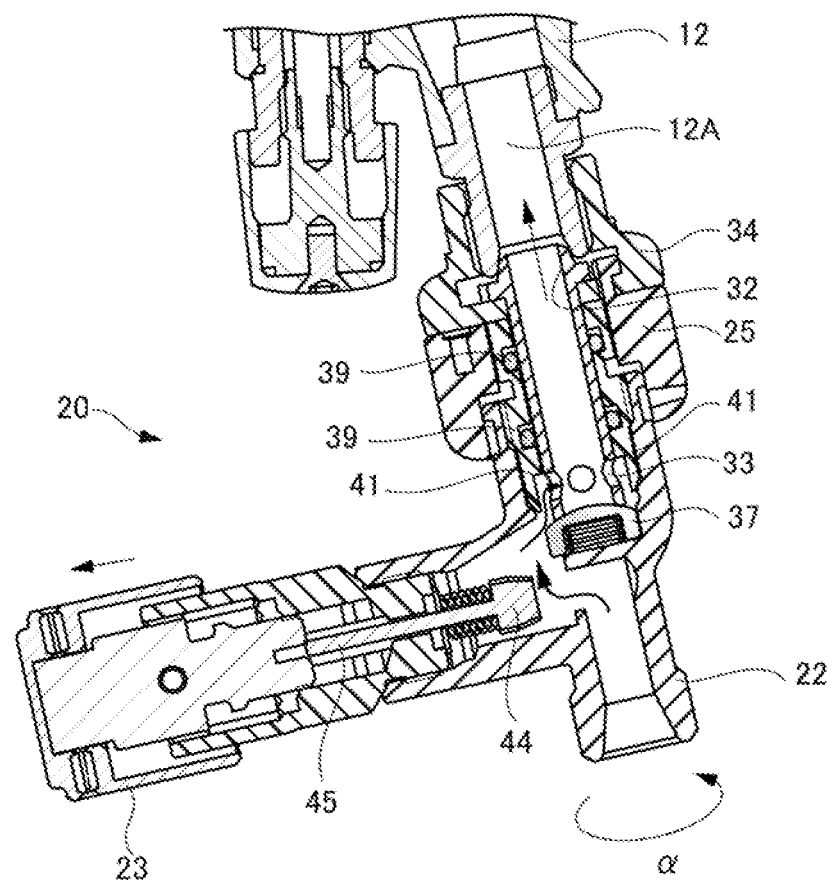
FIG. 9 is a sectional view showing a state in which the air induction pipe is inserted into an induction pipe inserting portion of the pressure sensor unit for attachment of the pressure sensor unit to the paint spray gun.

FIG. 9 is a sectional view showing a case where the air induction pipe 32 is inserted into the induction pipe inserting portion 36 of the pressure sensor unit 20 so that the pressure sensor unit 20 is attached to the paint spray gun 10. FIG. 9 shows a state in which the air quantity control valve 44 is opened by rotating the knob 23.

In FIG. 9, in the event that the attachment of the attachment bearing portion 34 and the attachment portion 25 is executed as shown in FIGS. 7A-C, 8A-D, the distal end of the air induction pipe 32 pushes on the valve portion 37 in the pressure sensor unit 20, and the valve portion 37 moves in a direction in which the spring 40 is compressed.

By the movement of the valve portion 37, air flows through a large diameter portion of the induction pipe inserting portion 36 which follows the step portion 41 and which has been closed by the valve portion 37 by that time. Then, the air passage holes 33 of the air induction pipe 32 are positioned in the large diameter portion of the induction pipe inserting portion 36, and air flows into the air induction pipe 32 through the air passage holes 33.

According to this configuration, by inserting the air induction pipe 32 into the induction pipe inserting portion 36 of the pressure sensor unit 20, the state where the air supply from the air passage 38 to the induction pipe inserting portion 36 is shut off shifts to a state where the air supply is opened.

When the attachment portion 25 of the pressure sensor unit 20 is removed from the attachment bearing portion 34, the air is prevented from flowing from the air passage 38 into the induction pipe inserting portion 36 by the valve portion 37; therefore, the troublesomeness accompanied by closing the main plug of the air supply source in advance can be eliminated.

Consequently, according to the pressure sensor unit of the invention, it is possible to eliminate the troublesomeness accompanied by removing the pressure sensor unit from the air tool and the troublesomeness accompanied by closing the main plug of the air supply source when the pressure sensor unit is removed.

The pressure sensor unit 20 attached in the way described heretofore can be rotated in a direction α in FIG. 9 relative to the paint spray gun 10. This enables the display 24 attached to the pressure sensor unit 20 to be oriented in an arbitrary direction, thereby an advantage being provided that the display 24 can be located in a position where the operator can easily look at the display 24.

Embodiment 2

In Embodiment 1, the pressure sensor unit 20 is attached to the paint spray gun 10 by bringing the hook claw portions 30 formed on the unit main body 21 into engagement with the elongated holes 35 formed on the paint spray gun 10 side. However, the attachment of the pressure sensor unit 20 to the paint spray gun 10 is not limited to the configuration of Embodiment 1, and hence, other configurations may be adopted.

Figure 10A:
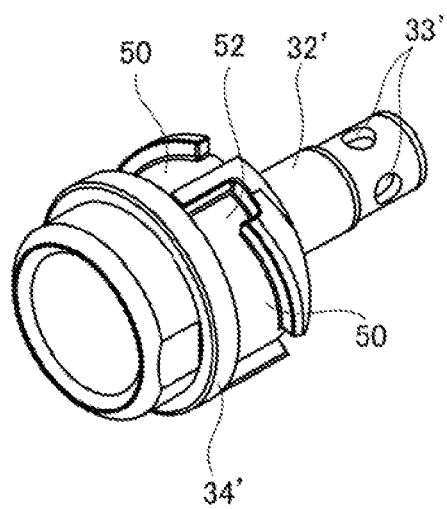
FIGS. 10A, 10B are perspective views of Embodiment 2, showing an attachment bearing portion formed on a paint spray gun side as viewed from different viewpoints.
Figure 10B:
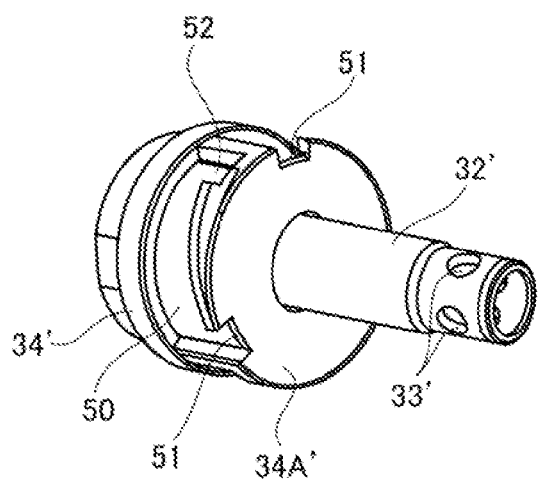
Figure 11:
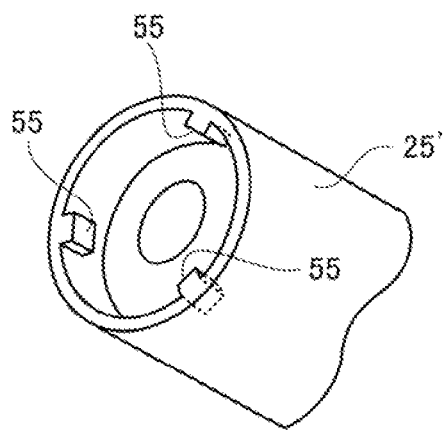
FIG. 11 is a perspective view of Embodiment 2, showing the configuration of an attachment portion formed on a pressure sensor unit side.

For example, a configuration shown in FIGS. 10A, 10B, 11 may be adopted. FIGS. 10A, 10B are perspective views showing an attachment bearing portion 34' formed on a paint spray gun 10 side as viewed from different viewpoints. An air induction pipe 32' is provided on the attachment bearing portion 34' so as to extend in an axial direction thereof. A plurality of (for example, three in the figures) recess portions 50 are formed on a circumferential surface of the attachment bearing portion 34'. In each recess portion 50, a notch 51 is formed in a surface 34A' from which the air induction pipe 32' extends, and the recess portion 50 extends from the notch 51 in the same circumferential direction while being inclined so as to move away from the surface 34A', terminating in a perpendicularly opening portion 52 which extends perpendicularly downwards to approach the surface 34A'.

FIG. 11 is a perspective view showing the configuration of an attachment portion 25' (corresponding to the attachment portion 25 in FIG. 2) formed on a pressure sensor unit 20. The attachment portion 25' is formed by a cylindrical member which covers a circumferential surface of the attachment bearing portion 34' on the paint spray gun 10 side. Projecting portions 55 are formed on an inner circumferential surface of the attachment portion 25' in positions which correspond to the notches 51 in the attachment bearing portion 34' on the paint spray gun 10 side.

In this configuration, the projecting portions 55 of the pressure sensor unit 20 are inserted into the corresponding notches 51 of the attachment bearing portion 34' on the paint spray gun 10 side. Then, as the pressure sensor unit 20 is rotated, the projecting portions 55 slide along the inclined recess portions 50 to thereby be disposed in the perpendicularly opening portions 52, whereby the pressure sensor unit 20 is fittingly attached to the paint spray gun 10.

Also when this configuration is adopted, the pressure sensor unit 20 can easily be attached to or detached from the paint spray gun 10.

Embodiment 3

While the paint spray gun is described as the air tool in both Embodiments 1 and 2, the invention is not limited thereto. Hence, the invention can, of course, be applied to a general air tool which supplies air, too.

Thus, while the invention has been described by reference to the embodiments, needless to say, the technical scope of the invention is not limited to the scopes of the embodiments described above. It is obvious to those skilled in the art to which the invention pertains that various alterations or improvements can be made to the embodiments described above. Additionally, it is obvious from what is described in claims that the resulting embodiments from those alterations or improvements can also be included in the technical scope of the invention.

(1) According to an embodiment, there is provided a pressure sensor unit to be attached to an air inlet port of an air tool, comprising: a unit main body including an induction pipe inserting portion configured to receive an air induction pipe projecting from the air tool, the unit main body configured to be detachably attached to the air tool by inserting the air induction pipe into the induction pipe inserting portion; an air passage configured to receive supply of air from the outside and configured to communicate with the induction pipe inserting portion; a pressure sensor configured to measure a pressure inside the air passage; and a valve portion configured to shut off an air supply from the air passage through the induction pipe insertion portion when the air induction pipe is not inserted in the induction pipe inserting portion, and configured to open the air supply from the air passage into the air induction pipe by the valve being pushed by the air induction pipe when the air induction pipe is inserted into the induction pipe inserting portion.

(2) According to an embodiment, the pressure sensor according to (1) above further comprises an air quantity control valve for controlling a flow rate of air provided upstream of a pressure measuring portion where a pressure inside the air passage is measured by the pressure sensor.

(3) According to an embodiment, in the pressure sensor unit according to (1) or (2) above, the air induction pipe comprises an air passage hole in a side surface of the air induction pipe, through which air passage hole air from the air passage is guided, and the pressure sensor unit is configured to perform the air supply from the air passage into the air induction pipe through the air passage hole when the air induction pipe is inserted into the induction pipe inserting portion.

(4) According to an embodiment, in the pressure sensor unit according to any one of (1) to (3) above, the unit main body comprises a hook claw portion configured to be brought into engagement with an elongated hole formed in the air tool side by rotation of the hook claw portion relative to the elongated hole, when the air induction pipe is inserted into the induction pipe inserting portion.

(5) According to an embodiment, in the pressure sensor unit according to (4) above, the unit main body comprises a biasing member configured to be biased in a direction in which the hook claw portion is restricted from being released from the elongated hole against a rotation of the hook claw portion in a direction in which the hook claw portion is released from an engagement with the elongated hole.

(6) According to an embodiment, in the pressure sensor unit according to any one of (1) to (3) above, the unit main body comprises a projecting portion configured to fit in a recess portion formed on the air tool side by rotation of the projecting portion relative to the recess portion, when the air induction pipe is inserted into the induction pipe inserting portion.

(7) According to an embodiment, in the pressure sensor unit according to (6) above, the recess portion comprises a inclined recess portion and a perpendicularly opening portion, the inclined recess portion extending along a circumferential direction of the induction pipe and terminating the perpendicularly opening portion, and the projecting portion is configured to slide along the inclined recess portion to be disposed in the perpendicularly opening portion, whereby the main body unit is attached to the air tool.

(8) According to an embodiment, in the pressure sensor unit according to any one of (1) to (7) above, the main body unit is configured to rotate around the air induction pipe of the air tool after the pressure sensor unit is attached to the air tool.

(9) According to an embodiment, the pressure sensor unit according to any one of (1) to (8) above further comprises a display attached to the unit main body for displaying a measured value measured by the pressure sensor.

(10) According to an embodiment, there is provided a pressure sensor unit is to be attached to an air inlet port of an air tool, comprising: a unit main body including an induction pipe inserting portion configured to receive an air induction pipe projecting from the air tool, the unit main body configured to be attached to the air tool detachably without a tool by inserting the air induction pipe into the induction pipe inserting portion; an air passage configured to receive supply of air from the outside and configured to communicate with the induction pipe inserting portion; and a pressure sensor configured to measure a pressure inside the air passage.

(11) According to an embodiment, the pressure sensor according to (10) above further comprises an air quantity control valve for controlling a flow rate of air provided upstream of a pressure measuring portion where a pressure inside the air passage is measured by the pressure sensor.

(12) According to an embodiment, in the pressure sensor unit according to (10) or (11) above, the air induction pipe comprises an air passage hole in a side surface of the air induction pipe, through which air passage hole air from the air passage is guided, and the pressure sensor unit is configured to perform the air supply from the air passage into the air induction pipe through the air passage hole when the air induction pipe is inserted into the induction pipe inserting portion.

(13) According to an embodiment, in the pressure sensor unit according to any one of (10) to (12) above, the unit main body comprises a hook claw portion configured to be brought into engagement with an elongated hole formed in the air tool side by rotation of the hook claw portion relative to the elongated hole, when the air induction pipe is inserted into the induction pipe inserting portion.

(14) According to an embodiment, in the pressure sensor unit according to (13) above, the unit main body comprises a biasing member configured to be biased in a direction in which the hook claw portion is restricted from being released from the elongated hole against a rotation of the hook claw portion in a direction in which the hook claw portion is released from an engagement with the elongated hole.

(15) According to an embodiment, in the pressure sensor unit according to any one of (10) to (12) above, the unit main body comprises a projecting portion configured to fit in a recess portion formed on the air tool side by rotation of the projecting portion relative to the recess portion, when the air induction pipe is inserted into the induction pipe inserting portion.

(16) According to an embodiment, in the pressure sensor unit according to (15) above, the recess portion comprises a inclined recess portion and a perpendicularly opening portion, the inclined recess portion extending along a circumferential direction of the induction pipe and terminating the perpendicularly opening portion, and the projecting portion is configured to slide along the inclined recess portion to be disposed in the perpendicularly opening portion, whereby the main body unit is attached to the air tool.

(17) According to an embodiment, in the pressure sensor unit according to any one of (10) to (16) above, the main body unit is configured to rotate around the air induction pipe of the air tool after the pressure sensor unit is attached to the air tool.

(18) According to an embodiment, the pressure sensor unit according to any one of (10) to (17) above further comprises a display attached to the unit main body for displaying a measured value measured by the pressure sensor.

According to the pressure sensor unit of an embodiment, it is possible to eliminate the troublesomeness accompanied by removing the pressure sensor unit from an air tool.

According to the pressure sensor unit of an embodiment, it is possible to eliminate the troublesomeness accompanied by closing a main plug of an air supply source when the pressure sensor unit is removed.

According to the pressure sensor unit of an embodiment, it is possible to eliminate the troublesomeness accompanied by removing the pressure sensor unit from an air tool and the troublesomeness accompanied by closing a main plug of an air supply source when the pressure sensor unit is removed.

Although the embodiments of the present invention have been described above based on some examples, the described embodiments are for the purpose of facilitating the understanding of the present invention and are not intended to limit the present invention. The present invention may be modified and improved without departing from the spirit thereof, and the invention includes equivalents thereof. In addition, the elements described in the claims and the specification can be arbitrarily combined or omitted within a range in which the above-mentioned problems are at least partially solved, or within a range in which at least a part of the advantages is achieved.

This application claims priority to Japanese Patent Application No. 2014-052207 filed on Mar. 14, 2014. The entire disclosure of Japanese Patent Application No. 2014-052207 filed on Mar. 14, 2014 including specification, claims, drawings and summary is incorporated herein by reference in its entirety.

The entire disclosure of Japanese Patent Application Publication No. 2003-211034 including specification, claims, drawings and summary is incorporated herein by reference in its entirety.

DESCRIPTION OF REFERENCE NUMERALS 10 paint spray gun (air tool); 11 gun main body; 12 grip portion; 13 trigger; 14 paint container cup; 15 air cap; 20 pressure sensor unit; 21 unit main body; 22 air inlet port; 23 knob; 24 display; 25 attachment portion; 27 communication hole; 28 pressure sensor; 30 hook claw portion; 32 air induction pipe; 33 air passage hole; 34 attachment bearing portion; 35 elongated hole; 36 induction pipe inserting portion; 37 valve portion; 38 air passage; 38A, 38B air passage; 39 O-ring; 40 spring; 41 stepped portion; 42 right-angled intersecting portion; 44 air quantity control vale; 45 shaft member; 46 spring; 50 recess portion; 51 notch; 52 perpendicularly opening portion; 55 projecting portion; 60 biasing member; 60A spring; 60B ball; 61 biasing member; 61A spring; 61B ball; 62 hole.

What is claimed is:

1. A pressure sensor unit to be attached to an air inlet port of an air tool, comprising:
a unit main body including an induction pipe inserting portion configured to receive an air induction pipe projecting from the air tool, the unit main body configured to be detachably attached to the air tool by inserting the air induction pipe into the induction pipe inserting portion;
an air passage configured to receive supply of air from the outside and configured to communicate with the induction pipe inserting portion;
a pressure sensor configured to measure a pressure inside the air passage; and
a valve portion configured to shut off an air supply from the air passage through the induction pipe insertion portion when the air induction pipe is not inserted in the induction pipe inserting portion, and configured to open the air supply from the air passage into the air induction pipe by the valve being pushed by the air induction pipe when the air induction pipe is inserted into the induction pipe inserting portion.

2. The pressure sensor according to claim 1, further comprising:
an air quantity control valve for controlling a flow rate of air provided upstream of a pressure measuring portion where a pressure inside the air passage is measured by the pressure sensor.

3. The pressure sensor unit according to claim 1, wherein the air induction pipe comprises an air passage hole in a side surface of the air induction pipe, through which air passage hole air from the air passage is guided, and the pressure sensor unit is configured to perform the air supply from the air passage into the air induction pipe through the air passage hole when the air induction pipe is inserted into the induction pipe inserting portion.

4. The pressure sensor unit according to claim 1, wherein the unit main body comprises a hook claw portion configured to be brought into engagement with an elongated hole formed in the air tool side by rotation of the hook claw portion relative to the elongated hole, when the air induction pipe is inserted into the induction pipe inserting portion.

5. The pressure sensor unit according to claim 4, wherein the unit main body comprises a biasing member configured to be biased in a direction in which the hook claw portion is restricted from being released from the elongated hole against a rotation of the hook claw portion in a direction in which the hook claw portion is released from an engagement with the elongated hole.

6. The pressure sensor unit according to claim 1, wherein the unit main body comprises a projecting portion configured to fit in a recess portion formed on the air tool side by rotation of the projecting portion relative to the recess portion, when the air induction pipe is inserted into the induction pipe inserting portion.

7. The pressure sensor unit according to claim 6, wherein
the recess portion comprises a inclined recess portion and a perpendicularly opening portion, the inclined recess portion extending along a circumferential direction of the induction pipe and terminating the perpendicularly opening portion, and
the projecting portion is configured to slide along the inclined recess portion to be disposed in the perpendicularly opening portion, whereby the main body unit is attached to the air tool.

8. The pressure sensor unit according to claim 1, wherein the main body unit is configured to rotate around the air induction pipe of the air tool after the pressure sensor unit is attached to the air tool.

9. The pressure sensor unit according to claim 1, further comprising a display attached to the unit main body for displaying a measured value measured by the pressure sensor.

* * * * *